(12) United States Patent
Miwa (10) Patent No.: US 6,512,557 B1
(45) Date of Patent: Jan. 28, 2003

(54) LIQUID CRYSTAL DISPLAY DEVICE AND PORTABLE INFORMATION TERMINAL DEVICE (75) Inventor: Tomoo Miwa, Tokyo (JP)

(73) Assignee: NEC Corporation (JP)

( * ) Notice: Subject to any disclaimer, the term of this patent is extended or adjusted under 35 U.S.C. 154(b) by 101 days.

(21) Appl. No.: 09/670,512

(22) Filed: Sep. 26, 2000

(30) Foreign Application Priority Data

Oct. 6, 1999 (JP) ............................................ 11-286085

(51) Int. Cl.[7] .............................................. G02F 1/1335
(52) U.S. Cl. .......................................... 349/58; 349/65
(58) Field of Search ........................ 349/65, 58; 362/31

(56) References Cited

U.S. PATENT DOCUMENTS 6,147,724 A * 11/2000 Yoshii et al. .................. 349/62
6,295,405 B1 * 9/2001 Jannson et al. ................ 349/65

FOREIGN PATENT DOCUMENTS

| JP | 9-152577 | 6/1997 | ......... G02F/1/1333 |
| JP | 09243828 | 9/1997 | ............ G02B/6/00 |
| JP | 10048427 | 2/1998 | ............ G02B/6/00 |

* cited by examiner

Primary Examiner—James Dudek
(74) Attorney, Agent, or Firm—Hayes Soloway PC

(57) ABSTRACT

A liquid crystal display device has a light source lamp, an optical guide plate for guiding light emitted from the light source lamp, a liquid crystal display panel provided on the optical guide plate, and a frame body for integrating the light source lamp, the optical guide plate and the liquid crystal display panel. The optical guide plate has a rectangular plate-shaped base portion, a rectangular plate-shaped projection projecting from an edge of the base portion, a width expanded portion provided at a corner between the base portion and a farther side of the projection from the side of light source lamp. The projection projects in the direction perpendicular to the direction of the advancing direction of the light in the base portion and parallel to the plate surface of the base portion. The width of the width expanded portion progressively increases toward the light source lamp. The frame body has a recessed portion to which the projection and the width expanded portions engage.

27 Claims, 5 Drawing Sheets

LIQUID CRYSTAL DISPLAY DEVICE AND PORTABLE INFORMATION TERMINAL DEVICE

BACKGROUND OF THE INVENTION

1. Field of the Invention

The present invention relates to a liquid crystal display device attached to the cover body of a laptop computer, a notebook type personal computer or the like to display images and a portable information terminal device having such a device.

2. Description of the Related Art

A portable information terminal device such as a laptop computer is provided with a keyboard at the top of the main body. The cover body to be lifted up and down and cover the keyboard is pivotally supported along the upper edge of the main body. The cover body is provided with a liquid crystal display device to display images.

The liquid crystal display device has an integral structure having a liquid crystal display panel (hereinafter as the "LCD panel") held between a backlight unit and a picture frame-like presser casing. In the backlight unit, a plurality of diffusion sheets, a plurality of prism sheets, an optical guide plate and a reflector sheet are sequentially placed upon one another. At the lower part of the optical guide plate, a light source lamp and a reflector mirror (reflector) are provided. These are secured to a plate-like frame body (hereinafter as "chassis") serving as a base.

The optical guide plate serves to propagate light emitted from the light source lamp upward and evenly supply the light over the entire display surface of the LCD panel. The optical guide plate has a rectangular shape when viewed two-dimensionally and a wedge-shaped cross section, for example. More specifically, the lower edge side closer to the light source lamp is thicker and the upper edge side farther from the light source lamp is thinner.

Figure 1A:
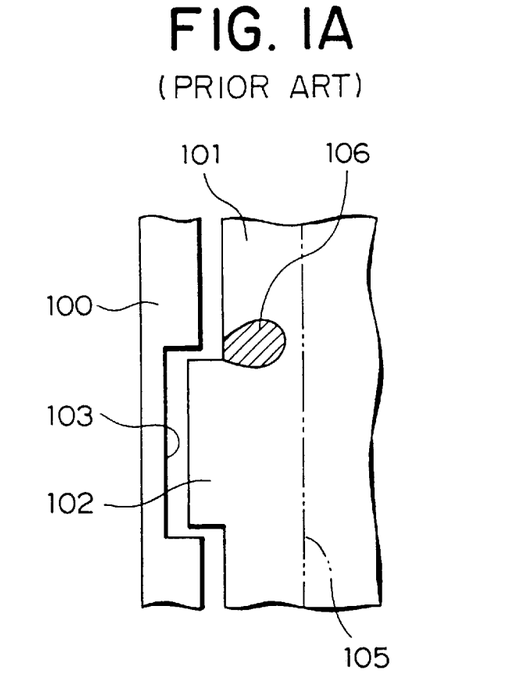
FIGS. 1A and 1B are schematic views showing how a conventional optical guide plate is secured to a chassis.
Figure 1B:
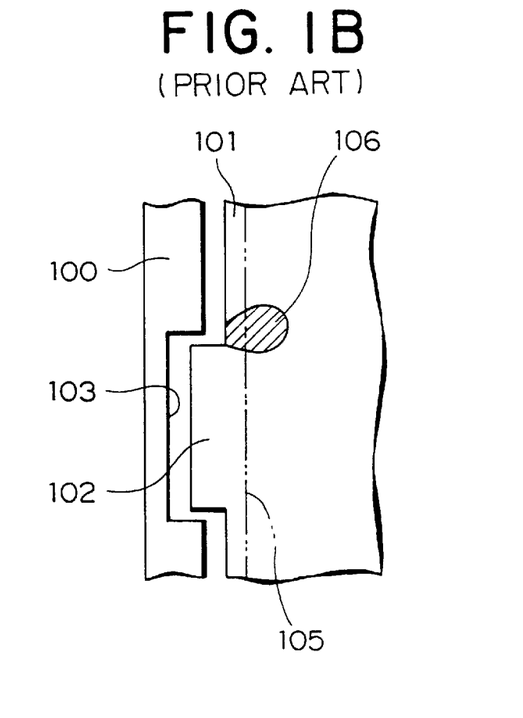

FIGS. 1A and 1B are schematic views showing how the optical guide plate is: secured to the chassis. On both side edges of the optical guide plate 101, there is a projection 102 projecting outward. Meanwhile, at a height in alignment with the projection 102 on the side frame of a chassis 100, a recessed portion 103 is formed. The engagement of the projection 102 with the recessed portion 103 secures the optical guide plate 101 at a prescribed position of the chassis 100.

Thus, even if for example the portable information terminal device having the liquid crystal display device is dropped, and large impact is applied upon the liquid crystal display device, the light source lamp can be prevented from being damaged as a result of the optical guide plate 101 moving downward to press the light source lamp (not shown).

It should be noted that the liquid crystal display device shown in FIG. 1B has a broader display surface than that shown in FIG. 1A, and an inner side 105 of the frame is positioned closer to the edge portion of the optical guide plate 101 in FIG. 1B than that shown in FIG. 1A.

The portable information terminal devices have been reduced in size to cope with the demand in the market, and the model whose main body is almost as small as the size of the keyboard has been recently marketed. There has also been a demand for a device with an enlarged display surface as well while there has been the demand for reducing the size of the main body. In order to satisfy these demands in the market, the frame portion of the cover body tends to be narrowed in recent portable information terminal devices.

For example, in a laptop computer, the cover body has an outer size almost the same as the main body. Therefore, if the size of the main body is further reduced, the cover body is reduced in size accordingly. When the display surface is to be expanded in the cover body whose size is to be further reduced, only the display surface is expanded with the width of the frame being narrowed.

It is generally known that in a conventional liquid crystal display device, as shown in FIGS. 1A and 1B, a luminescent spot 106 (hatched) is generated at a position in close proximity to the upper part of the projection 102. This is caused because the projections 102 are provided at both side edges of the optical guide plate 101 through which light must be homogeneously propagated at any positions. More specifically, the reflection state of the light changes by the presence of the projections 102, and the homogeneity of propagation is lost, which causes light and dark areas to be generated at the position in the close proximity of the upper part to the projections 102.

The luminescent spot 106 is hidden by the frame 105 of the cover body if the frame 105 has a relatively large width as shown in FIG. 1A. Therefore, the spot does not appear in the actual display surface and it was not a significant problem before the attempt to reduce the width of the frame 105 as described above. However, as the width of the frame has come to be narrowed as described above, as shown in FIG. 1B, the luminescent spot 106 appears on the display surface. Therefore, an image near the frame is difficult to view.

It will be described how such a fixed structure as shown in FIGS. 1A and 1B have come to be employed in the conventional device.

As stated above, it would be readily conceived to provide projections on the side edge of the optical guide plate and recesses on the chassis and let them engage with each other in order to prevent the light source lamp from being damaged by the optical guide plate. However the positions where the projections and recesses are provided are not arbitrary. More specifically, the presence of the luminescent spot itself is a problem to be addressed even if it could be covered by the frame. Therefore, the possibility of providing them at the upper or lower part of the side edges believed to be less susceptible to the influence of the luminescent spot was originally considered, but the idea was turned down for the following reasons.

The optical guide plate lets light emitted from the light source lamp upward and supplies light homogeneously over the entire display surface as described above. The optical guide plate can carry out the function successfully if it has a wedge-like cross section with a thicker lower edge side and a thinner upper edge side. Therefore, in order to reduce the weight of the liquid crystal display device as much as possible, the wedge shape as described above is employed for the optical guide plate. If a projection is provided on an upper portion of a side edge of the optical guide plate having the wedge shape, however, impact applied thereupon by falling could cause a crack at the base of the projection because the thickness at the part of the optical guide plate is small. This is a reason for turning down the idea of providing a projection at the upper part (the first reason).

The amount of light propagated through the optical guide plate increases toward the lower edge (closer to the light source lamp) and decreases toward the upper edge (farther from the light source lamp). This is because the light scatters from the display surface as it propagates. Therefore, if a projection is provided at a lower portion of the side edge of the optical guide plate, the amount of light is greater at the portion with the projection and greater difference results between the dark and light areas in the closer proximity with the projection. As a result, the luminescent spot becomes clearly visible. This is a reason for turning down the idea of providing the projection at the lower part (the second reason).

In view of the first reason, the projection is preferably provided at a position closer to the lower edge (thicker side). Meanwhile, in view of the second reason, the projection is preferably provided at a position closer to the upper edge (farther from the light source lamp). As a result, the fixed structure having the projection at the center of the side edge as shown in FIGS. 1A and 1B has been employed as a compromise between the first and second reasons. In this structure, the luminescent spots appear in the middle stages on both sides of the display surface, but they were not such a significant problem when there was not much need for reducing the width of the frame because these luminescent spots were covered and hidden by the frame.

Furthermore, the optical guide plate is generally manufactured by resin molding. In order to provide a wedge-shaped cross section, a mold into which resin is injected from the lower edge side (thicker side) to the upper edge side (thinner side) is used. However, when the projection is provided at the upper part of the side edge, the recessed portion to define the shape of the projection is apart from the resin inlet, and therefore the resin is less likely to reach to the position. This could cause additional processing work or processing precision may be lowered.

For example, Japanese Patent Laid-Open Publication No. Hei. 10-48427 discloses a surface light source device provided with securing means at a position corresponding to the upper edge (thinner side) of the optical guide plate. In the conventional surface light source device, there is a stopper like a turned part along the tip end (upper edge) of an optical guide plate. The stopper is engaged with a recessed portion provided at a frame to secure the optical guide plate to the frame. It should be noted that the frame corresponds to the presser frame or the chassis.

In the surface light source device disclosed in the publication, the stopper is provided at the entire tip end of the optical guide plate, and therefore force acting upon the optical guide plate is dispersed. As a result, there would be no problem in terms of strength against impact at the time of falling for example. However, it should be extremely difficult to form a stopper in such a complicated form at the tip end of the optical guide plate which is probably manufactured by molding as described above.

For example, Japanese Patent Laid-Open Publication No. Hei. 9-243828 discloses a surface light source device provided with securing means at a position corresponding to the lower part of the side edge of the optical guide plate. The conventional surface light source device has a raised portion for positioning integrally formed on a side surface of a light incident surface side (at the lower portion of the side edge, on the thickest part side). The raised portion is supported by a recessed portion of a frame to secure the optical guide plate to the frame.

In the surface light source device disclosed in the publication, the raised portion has a complicated polygonal shape, and luminance variation is alleviated by reflecting incident light to the raised portion upon each surface. However, also in this case, it would be extremely difficult to form such a raised portion in a complicated shape as shown in the publication at the optical guide plate which is probably manufactured by molding as described above.

This is how the optical guide plate has come to be secured in the above manner. This structure however allows the luminescent spot to be visible on the display surface, as the demand to narrow the frame has to be satisfied. Therefore, there is a demand for a structure which can prevent the effect of the luminescent spot while the frame is attempted to be narrowed.

SUMMARY OF THE INVENTION

It is an object of the present invention to provide a liquid crystal display device and a portable information terminal device capable of making less visible a luminescent spot which causes a problem in narrowing the frame of the cover body, and clearly displaying images in the vicinity of the frame.

According to one aspect of the present invention, a liquid crystal display device comprises a light source lamp, an optical guide plate which guides light emitted from the light source lamp, a liquid crystal display panel provided on the optical guide plate and a frame body to integrate the light source lamp, the optical guide plate and the liquid crystal display panel. The optical guide plate includes, a rectangular plate-shaped base portion, a rectangular plate-shaped projection which projects from an edge of said base portion, and a width expanded portion provided at a corner portion between said base portion and a farther side surface of said projection viewed from the side of said light source lamp. The projection projects in the direction perpendicular to the advancing direction of said light in said base portion and parallel to the plate surface of said base portion. The Width of said width expanded portion progressively increases toward said optical lamp. The frame body has a recessed portion to which said projection and said width expanded portion engage.

According to the aspect of the present invention, when light propagating through the inside of the optical guide plate is incident on. the width expanded portion, the light is reflected upon the boundary of the width expanded portion and diffuses, so that the difference between the dark and light areas is reduced. As a result, a luminescent spot in the vicinity of the projection and seen from the display surface becomes less visible.

In addition, the width expanded portion allows the projection to be less susceptible to damage by impact caused in falling or the like. In the conventional optical guide plate, there is a corner portion of 90° at the root of the projection, in other words between the projection and the side edge, thereby a crack might be generated by stress concentration at the corner portion caused by impact applied upon the optical guide plate. In contrast, according to the present invention, impact upon the optical guide plate will not cause stress concentration between the projection and the edge of the base portion. Therefore, the impact resistance and oscillation resistance of the liquid crystal display device are improved.

Furthermore, the width expanded portion allows the productivity of the optical guide plate to be improved. As described above, an optical guide plate is manufactured by resin molding, and at the time of injecting resin into a mold typically, the resin coming into the recessed portion to define the projection flows along the edge of the width expanded portion. Therefore, the fluidity of the resin improves, which facilitates the injection operation. In addition, the improved fluidity reduces the residual stress generated in the projection molded by the recess. Therefore, the optical guide plate can be prevented from being deformed by the residual stress after curing, and the workability are improved.

If a portion perpendicular to the edge of the base portion from which the projection projects is provided at the further side surface, the direction of force acting upon the region between the projection and the recessed portion through the portion is substantially parallel to the edge of the base portion. As a result, when impact is applied, the force restricting the vertical movement of the optical guide plate acts in the direction opposing the moving direction of the optical guide plate. Therefore, a luminescent spot or a luminescent line can be prevented from being generated in association with a shift of the optical guide plate on the frame body.

When the width expanded portion has an edge of a smooth curved surface shape, light being incident on the width expanded portion is reflected upon and is diffused in a wider range. Therefore, the difference between dark and light areas is further reduced, so that the luminescent spot is less visible. At this time, a portion perpendicular to the edge of the base portion is. necessarily present between an end portion of the width expanded portion and the further side surface of the projection if the radius of curvature of the edge of the curved surface shape is not more than the projecting width of the projection. Thus, the force restricting the vertical movement of the optical guide plate acts upon in the direction opposing the moving direction of the optical guide plate through the portion as described above. Consequently, a luminescent spot or a luminescent line can be prevented from being generated in association with a shift of the optical guide plate on the frame body.

Similarly, if the width expanded portion has an edge including a plurality of planes, preferably a polygonal shaped edge resembling a smooth curved surface, light being incident on the width expanded portion is reflected and diffused in a wider range. This reduces the difference between dark and light areas, and the luminescent spot becomes less visible.

When the width expanded portion has an edge of a shape formed by combining a smooth curved surface and a plurality of planes or a plane edge, the reflecting direction of the light can be adjusted. As a result, the difference between dark and light areas can be arbitrarily reduced.

According to another aspect of the present invention, a liquid crystal display device comprises two light source lamps, an optical guide plate provided between the two light source lamps which guides light emitted from the light source lamps, a liquid crystal display panel provided on the optical guide plate and a frame body which integrates the light source lamps, the optical guide plate and the liquid crystal display panel. The optical guide plate comprises a rectangular plate-shaped base portion, a rectangular plate-shaped projection which projects from an edge of said base portion, and width expanded portions provided at corner portions between each side surface of said projection and. said base portion. The projection projects in the direction perpendicular to the advancing direction of said light in said base portion and parallel to the plate surface of said base portion. The width of said width expanded portions progressively increases toward said optical lamp provided at the opposite side in respect of said projection. The frame body has a recessed portion to which said projection and said width expanded portions engage.

Also in this case, the light propagating in the optical guide plate is reflected and diffused at the boundary of the width expanded portion. Therefore, the difference between dark and light areas is reduced at a position in the vicinity of end surfaces above and under the projection, so that the luminescent spot becomes less visible. Furthermore, similarly to the above described liquid crystal display device, the strength of the projection against impact caused by falling or the like is improved and the productivity of the optical guide plate improves as well.

According to another aspect of the present invention, a portable information terminal device integrates any of the liquid crystal display devices described above. Therefore, a luminescent spot on the screen is less visible, and the display surface is more acceptable. The impact resistance and oscillation resistance are improved and the device becomes easier to handle. In addition, the productivity of the optical guide plate is improved, which reduces the manufacturing cost.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENT

Figure 2:
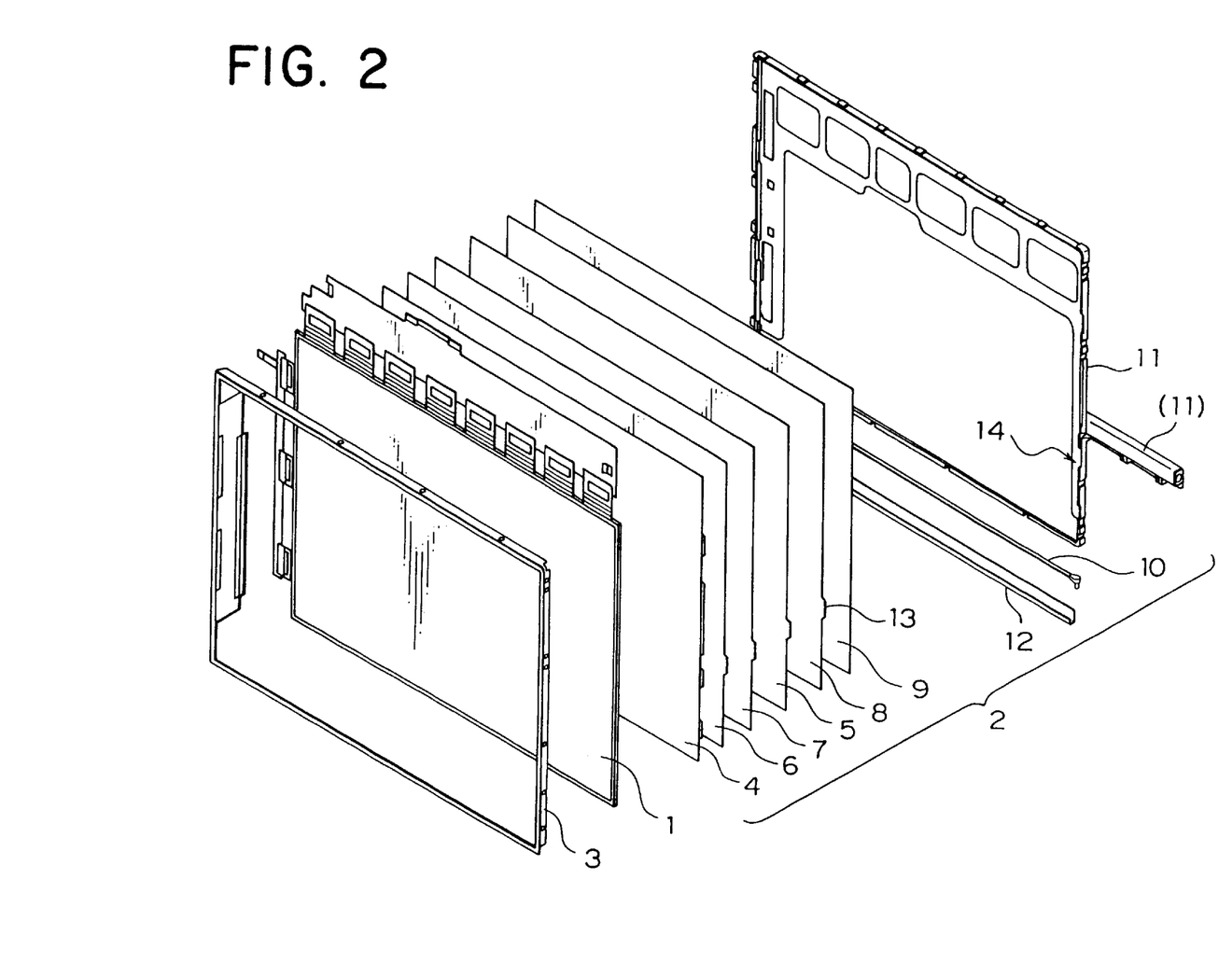
FIG. 2 is an exploded perspective view of a liquid crystal display device according to a first embodiment of the present invention.

The preferred embodiments of the present invention will be described more specifically below with reference to the accompanying drawings. FIG. 2 is an exploded perspective view of a liquid crystal display device according to a first:embodiment of the present invention. It should be noted that the overview of the portable information terminal device as a whole is not shown.

In the liquid crystal display device according to the first embodiment, a liquid crystal display (LCD) panel 1 is secured as it is held between a backlight unit 2 and a presser frame 3. The backlight unit 2 includes for example a reflector sheet 9, an optical guide plate 8, a diffusion sheet 5, prism sheets 7, 6 and a diffusion sheet 4 sequentially placed upon one another on a chassis (frame body) 11. Below the chassis 11, there are a light source lamp 10 and a reflector mirror (reflector) 12. The diffusion sheets 4, 5, the prism sheets 6, 7, the optical guide plate 8, and the reflector sheet 9 are placed upon one another in the order shown in FIG. 2. Meanwhile, at the lower part of the optical guide plate 8, the light source lamp 10 and the reflector 12 are provided, and they are secured on the chassis 11 for integration by an adhesive tape (not shown) or the like.

At the intermediate position between both side edges of the optical guide plate 8, a projection 13 is formed to project outward. At the rising edges of the chassis 11 storing the optical guide plate 8, recessed portions 14 corresponding to the projections 13 are formed. When each of the projections 13 is engaged with the recessed portion 14, the optical guide plate 8 is secured at a prescribed position of the chassis 11.

Figure 3:
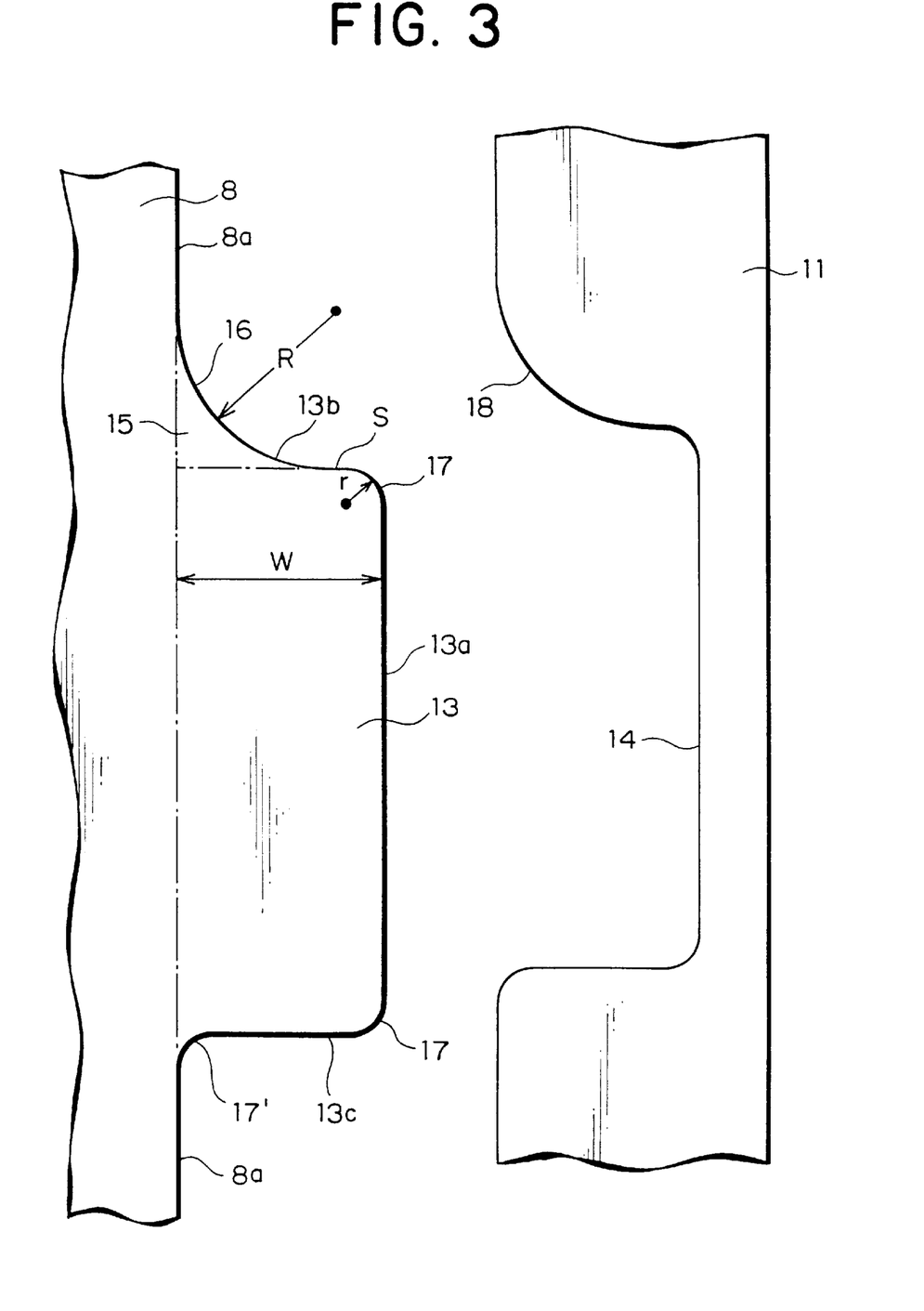
FIG. 3 is a schematic view of a projection of an optical guide plate and a recess of-a chassis according to the first embodiment.

FIG. 3 is a schematic view of the projection of the optical guide plate and the recess of the chassis.

The projection 13 is in a rectangular shape elongate in the vertical direction of the optical guide plate 8 in a plan view, and both surfaces at the front and back are formed flush with the optical guide plate 8. The side surface 13a of the projection 13 is parallel with the side edge 8a of the optical guide plate 8.

Between the upper end surface 13b positioned farther from the light source lamp 10 (not shown in FIG. 3) among the upper end surface 13b and lower end surface 13c of the projection 13, and the side edge 8a adjacent to the upper end surface 13b, a width expanded portion 15 having a transverse width in the optical guide plate 8 progressively increased toward the light source lamp 10 is formed to connect the side edge 8a and the projection 13. The edge of the width expanded portion 15 defines, for example, a concave curved surface 16 having a radius of curvature R which smoothly connects the side edge 8a and the upper end surface 13b.

The corner at which the upper end surface 13b and the side surface 13a cross is slightly chamfered, and a convex curved surface 17 having a radius or curvature r is formed. It should. be noted that another convex curved surface 17 having a radius of curvature r is formed at the corner at which the lower end surface 13c and side surface 13a cross, and also a concave curved surface 17' having a radius of curvature r is formed at the corner at which the lower end surface 13c and the adjacent side edge 8a cross. They are chamfered to improve the mold releasing characteristic of the optical guide plate 8 manufactured by resin molding.

When the width of the projection 13 projecting outward from the side edge 8a is W, the radius of curvature R of the concave curved surface 16 is, for example, produced by the subtraction of the radius of curvature r of the convex curved surface 17 from the projecting width W of the projection 13.

Meanwhile, the recessed portion 14 has the same curved surface as that of the projection 13 to store the projection 13 provided with the width expanded portion 15. At the position corresponding to the concave curved surface 16 in particular, a convex curved surface 18 having the radius of curvature R is formed.

In the liquid crystal display device having the structure according to the first embodiment, when light propagating through the inside of the optical guide plate 8 is incident on the width expanded portion 15, the light is reflected at the boundary of the width expanded portion 15 (concave curved surface 16) in a wide range and diffused. Therefore, the difference between dark and light areas at the display surface is reduced and a luminescent spot is less visible.

The width expanded portion 15 prevents stress concentration between the projection 13 and the side edge 8a even if there is impact upon the optical guide plate 8. Therefore, the strength of the projection 13 against the impact caused by falling or the like is improved.

It should be noted that the larger the radius of curvature R of the concave curved surface 16, the less visible will be the luminescent spot generated from the concave curved surface 16. Meanwhile, the upper end surface 13b and the wall surface of the recessed portion 14 are preferably perpendicular to each other in order to restrict the movement of the optical guide plate 8 in the vertical direction. Therefore, the maximum value of the radius of curvature R of the concave curved surface 16 is set to the value produced by subtracting the radius of curvature r of the convex curved surface 17 from the projecting width W of the projection 13, so that a portion S perpendicular to the side edge 8a is provided between the edge of the width expanded portion 15 and the upper end surface 13b. The direction of the force acting upon the region between the projection 13 and the recessed portion 14, in other words the direction of the force acting upon the region between the optical guide plate 8 and the chassis 11 is almost parallel to the side edge 8a through the portion S. Therefore, force restricting the vertical movement of the optical guide plate 8 when there is impact thereupon acts in the direction opposing the moving direction of the optical guide plate 8, so that a luminescent spot and luminescent line because of a shift of the chassis 11 on the optical guide plate 8 can be prevented from being generated.

It should be noted that the radius of curvature R is not limited to the maximum value described above. If the radius of curvature R is larger than the radius of curvature r, the luminescent spot can be effectively less visible. Therefore, if the original amount of light is small, or the most intensive part of the luminescent spot is hidden by other means to lower the intensity of the luminescent spot, the radius of curvature R may have a smaller value than the maximum value as above.

These are the effects brought about when the liquid crystal display device is used, but other effects are provided according to the present embodiment. More specifically, since the optical guide plate 8 has the width expanded portion 15, the productivity of the optical guide plate 8 is also improved. The optical guide plate 8 is produced by resin molding as described above, for example. According to the embodiment, when resin is injected to a mold, the resin comes into the recessed portion of the mold to form the projection 13 and flows along the curved surface to mold the width expanded portion 15, so that the fluidity of the resin is improved, which facilitates the injection operation. Furthermore, the improved fluidity of the resin restrains the residual stress from being generated in the projection 13 molded by the recess, and deformation of the optical guide plate 8 after curing, which would be caused by such residual stress, can be prevented. This also improves the workability. Note that such deformation is called "sink mark".

In a portable information terminal device including the liquid crystal display device according to the first embodiment, a luminescent spot is less visible and the display surface is more acceptable. The impact resistance and oscillation resistance are improved and the device will be easy to handle. The productivity of the liquid crystal display device including the optical guide plate 8 increases, which can reduce the manufacturing cost.

It should be noted that in the first embodiment, the projection 13 is formed substantially in the center of the side edge 8a. This arrangement is employed for the first and second reasons mentioned above, but if these reasons do not apply, the projection 13 may be, for example, formed closer to the upper or lower part of the side edge 8a.

Also in the first embodiment, the light source lamp 10 is provided along the lower part of the optical guide plate 8, but the invention is not limited to the arrangement. For example, the light source lamp may be provided along one side edge of the optical guide plate. In this case, the projection is provided at the upper and lower edges.

Furthermore, in the first embodiment, the edge of the width expanded portion 15 forms the concave curved surface 16 with the radius of curvature R which smoothly connects the side edge 8a and the end surface 13b, but the invention is not limited to such a curved surface. For example, a polygonal shape resembling a smooth curved surface, or a combination of a curved surface shape and a polygonal shape may be employed. FIGS. 4A to 4G show various shape examples which could be employed for the width expanded portion.

Figure 4A:
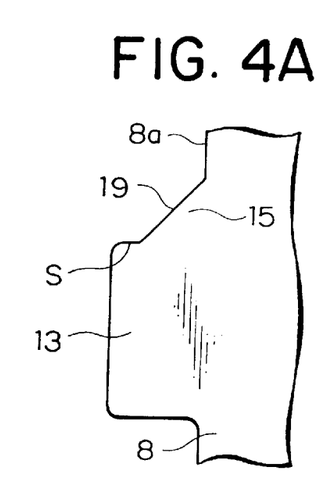
FIGS. 4A to 4G are schematic views showing various shapes which can be employed for the width expanded portion.
Figure 4B:
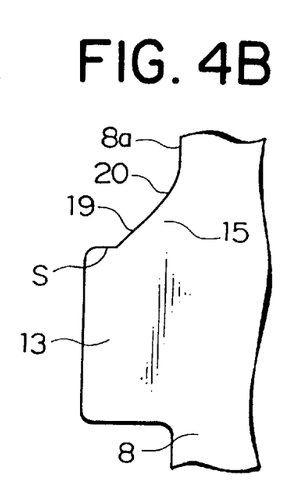
Figure 4C:
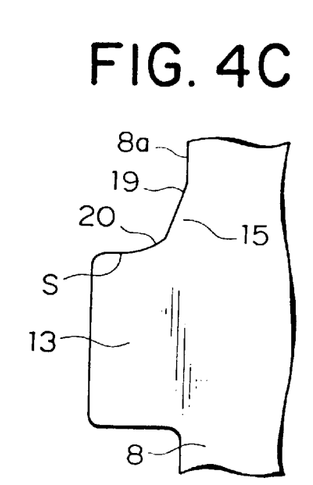
Figure 4D:
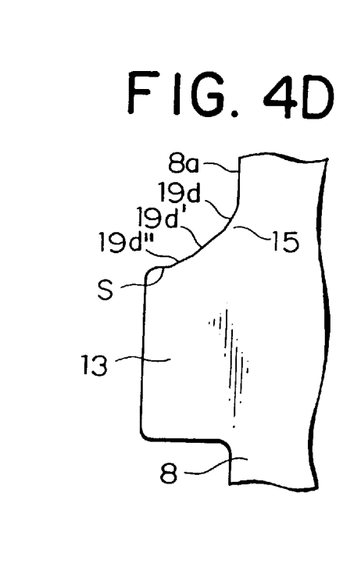
Figure 4E:
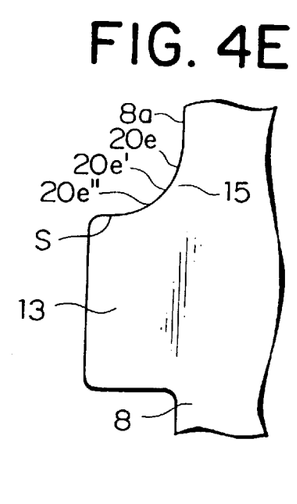
Figure 4F:
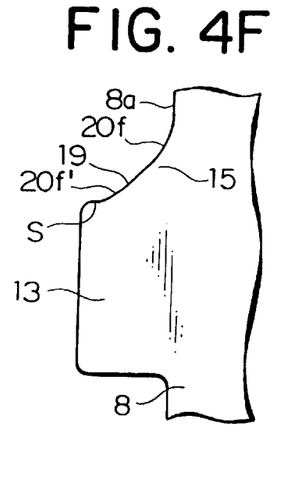
Figure 4G:
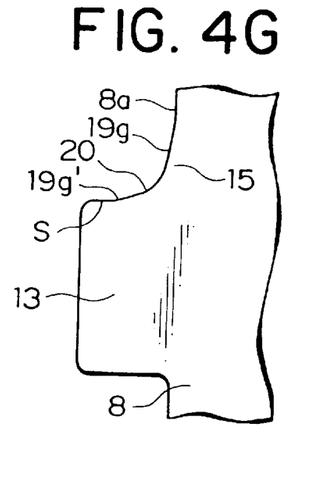

In FIG. 4A, the edge of the width expanded portion 15 is formed by an inclined surface 19. In FIGS. 4B and 4C, the edge of the width expanded portion 15 is formed by a combination of the inclined surface 19 and a concave curved surface 20. In FIG. 4B, the inclined surface 19 is provided below the concave curved surface 20, and in FIG. 4C, the inclined surface 19 is provided above the concave curved surface 20. In FIG. 4D, the width expanded portion 15 is formed of a polygonal shape by a combination of three inclined surfaces 19d, 19d' and 19d". In FIG. 4E, the width expanded portion 15 is formed by a combination of three concave curved surfaces 20e, 20e' and 20e" having different radii of curvature from one another. In FIG. 4F, the width expanded portion 15 is formed by a combination of two concave curved surfaces 20f and 20f' having different radii of curvature from each other and the inclined surface 19 therebetween. In FIG. 4G, the width expanded portion 15 is formed by a combination of two inclined surfaces 19g, 19g' and the concave curved surface 20 therebetween.

These shapes are selected as required depending upon various conditions such as the size or shape of the optical guide plate 8, the specification or number of the light source lamps 10, the position to form the projection 13, etc. Meanwhile, the difference between dark and light areas may be reduced by adjusting the direction of the reflection of light by combining such inclined surfaces and curved surfaces. It should be noted that in any of the shapes, there exists the portion S perpendicular to the side edge 8a in the upper end surface 13b.

Figure 5:
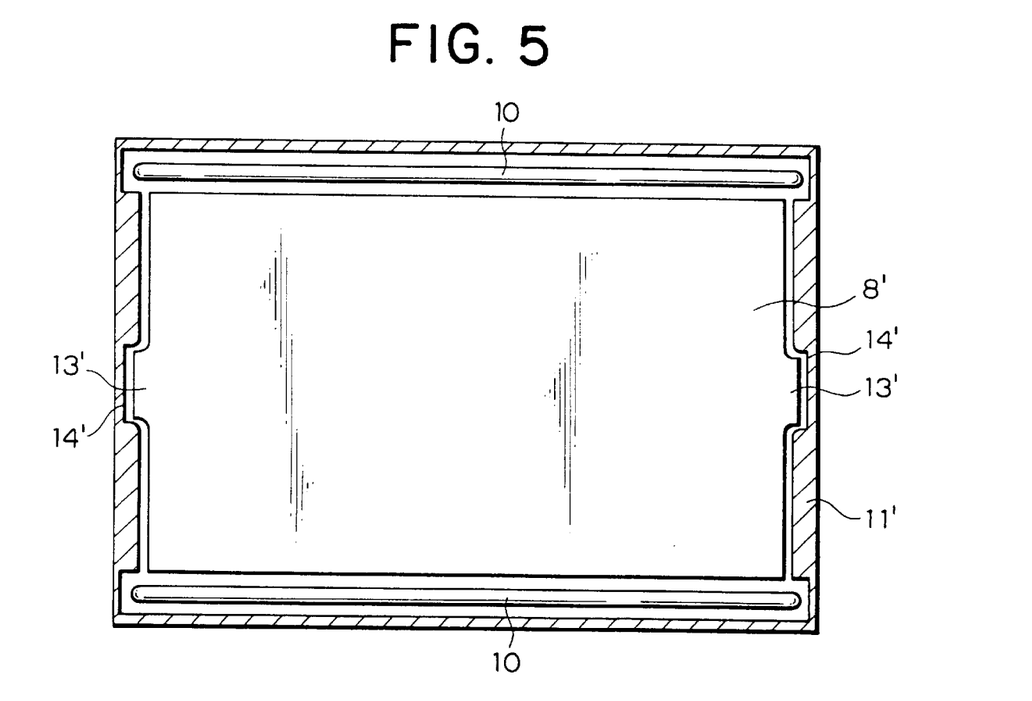
FIG. 5 is a schematic overview of a liquid crystal display device according to a second embodiment of the present invention.
Figure 6:
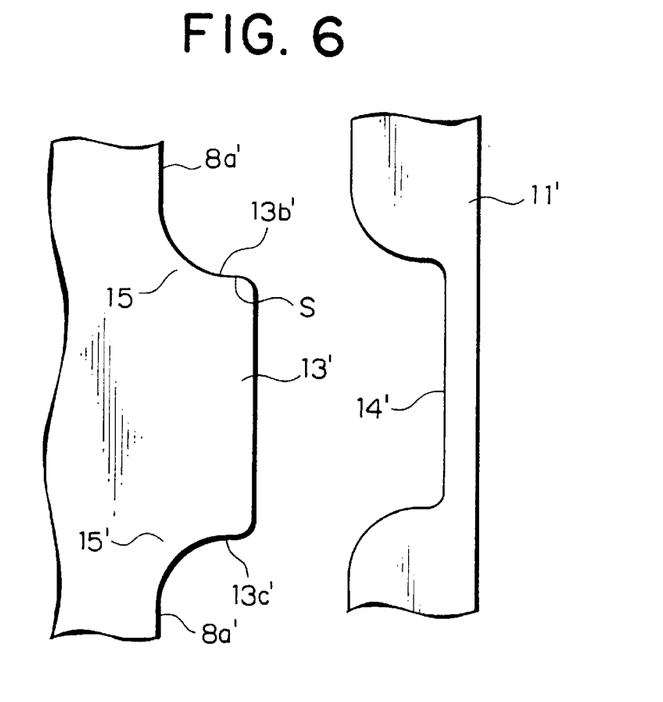
FIG. 6 is a schematic view of a projection of an optical guide plate and a recess of a chassis according to the second embodiment.

A second embodiment of the present invention will be now described. FIG. 5 is a schematic view of a liquid crystal display device according to the second embodiment of the present invention. FIG. 6 is a schematic view of a projection of an optical guide plate and a recess of a chassis according to the second embodiment. It should be noted that in the second embodiment, the same elements as those in the first embodiment are denoted by the same reference characters and detailed descriptions thereof are not provided.

In the second embodiment, light source lamps 10 are provided above and under an optical guide plate 8'. The optical guide plate 8' does not have a wedge-shaped cross section, and has a uniform thickness.

At a position slightly below from the center of each of the side edges of the optical guide plate 8', a projection 13' is formed like in the first embodiment. As shown in FIG. 6, the projection 13' is provided with a width expanded portion 15 between an upper end surface 13b' and a side edge 8a' similarly to the first embodiment. A width expanded portion 15' symmetrical with the width expanded portion 15 is formed between a lower end surface 13c' and the side edge 8a'.

Meanwhile, a recessed portion 14' to which they are engaged is formed in a position of a frame body 11' (hatched) at alignment with the projection 13', the width expanded portion 15 and the width expanded portion 15'.

In the liquid crystal display device according to the second embodiment having such a structure, light emitted from the light source lamp 10 provided on the upper side causes dark and light areas to be generated at a position near the lower part of the projection 13'. However, since the width expanded portion 15' is formed in the liquid crystal display device according to the second embodiment, the difference between dark and light areas generated at the position is smaller and the luminescent spot is less visible. The presence of the width expanded portion 15' allows the impact resistance and oscillation resistance of the projection 13' to be improved, and the productivity of the optical guide plate 8' is also improved.

Therefore, in a portable information terminal device integrating the liquid crystal display device according to the second embodiment, a luminescent spot is less visible and the display surface is more acceptable. The impact resistance and oscillation resistance are improved, so that the device can be easier to handle. The productivity of the liquid crystal display device including the optical guide plate 8' can be effectively improved, which can reduce the manufacturing cost.

It should be noted that also in the second embodiment, various shapes as shown in FIGS. 4A to 4G, for example, may be employed for the width expanded portion 15'.

According to the second embodiment, the light source lamps 10 are provided above and under the optical guide plate 8', but light source lamps may be provided, for example, along both of side edges of the optical guide plate. In this case, projections are provided at the upper and lower edges thereof.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A liquid crystal display device, comprising:
   a light source lamp;
   an optical guide plate which guides light emitted from said light source lamp, said optical guide plate comprising:
      a rectangular plate-shaped base portion;
      a rectangular plate-shaped projection which projects from an edge of said base portion, said projection projecting in the direction perpendicular to the advancing direction of said light in said base portion and parallel to the plate surface of said base portion; and
      a width expanded portion provided at a corner portion between said base portion and a farther side surface of said projection viewed from the side of said light source lamp, the width of said width expanded portion progressively increasing toward said optical lamp;
   a liquid crystal display panel provided on said optical guide plate; and
   a frame body which integrates said light source lamp, said optical guide plate and said liquid crystal display panel, said frame body having a recessed portion to which said projection and said width expanded portion engage.

2. The liquid crystal display device according to claim 1, wherein said side surface comprises a portion being perpendicular to the edge of said base portion from which said projection projects.

3. The liquid crystal display device according to claim 1, wherein said width expanded portion has an edge having a smooth curved surface shape.

4. The liquid crystal display device according to claim 3, wherein the radius of curvature of said edge of said curved surface shape is at most the projecting width of said projection.

5. The liquid crystal display device according to claim 1, wherein said width expanded portion has an edge including a plurality of planes.

6. A liquid crystal display device, comprising:
two light source lamps;
an optical guide plate which guide lights emitted from said light source lamps, said optical guide plate comprising:
a rectangular plate-shaped base portion;
a rectangular plate-shaped projection which projects from an edge of said base portion, said projection projecting in the direction perpendicular to the advancing direction of said light in said base portion and parallel to the plate surface of said base portion; and
width expanded portions provided at corner portions between each side surface of said projection and said base portion, the width of said width expanded portions progressively increasing toward said optical lamp provided at the opposite side in respect of said projection;
a liquid crystal display panel provided on said optical guide plate; and
a frame body which integrates said light source lamps, said optical guide plate and said liquid crystal display panel, said frame body having a recessed portion to which said projection and said width expanded portions engage.

7. A portable information terminal device, integrating said liquid crystal display device according to claim 1.

8. A portable information terminal device, integrating said liquid crystal display device according to claim 2.

9. A portable information terminal device, integrating said liquid crystal display device according to claim 3.

10. A portable information terminal device, integrating said liquid crystal display device according to claim 4.

11. A portable information terminal device, integrating said liquid crystal display device according to claim 5.

12. A portable information terminal device, integrating said liquid crystal display device according to claim 6.

13. A portable information terminal device, integrating said liquid crystal display device according to claim 7.

14. A portable information terminal device, integrating said liquid crystal display device according to claim 6.

15. A liquid crystal display device, comprising:
a liquid crystal device, a plurality of optical sheets, and an optical guide plate each having a rectangular shape and placed upon one another;
a light source lamp provided along one of two opposing sides of said optical guide plate; and
a frame body having a shallow bottom portion, said frame body having said liquid crystal device, said plurality of optical sheets, said optical guide plate and said light source lamp fitted therein for integration, wherein
projections projecting outward are formed at both opposing side edges of said optical guide plate between said two sides,
said frame body has a recess to which each of said projections is engaged correspondingly, and
width expanded portions are provided between the end surfaces of said projections positioned farther from said light source lamp side and said side edge adjacent to said end surface, respectively said width expanded portion having a width progressively increased between said side edge of the guide plate toward the light source lamp to connect the side edge and the projection.

16. A liquid crystal display device, comprising:
a liquid crystal device, a plurality of optical sheets and an optical guide plate each having a rectangular shape and placed upon one another;
two light source lamps provided along opposing two sides of said optical guide plate, respectively; and
a frame body having a shallow bottom portion, said frame body having said liquid crystal device, said plurality of optical sheets, said optical guide plate and said light source lamps fitted therein for integration; wherein
projections projecting outward are formed at both opposing side edges of said optical guide plate between said two sides,
said frame body has a recess to which each of said projections is engaged correspondingly, and
width expanded portions are provided between the two opposing end surfaces of said projections and said side edge adjacent to said end surface, respectively, said width expanded portion having a width progressively increased between said both side edges of the optical guide plate toward the light source lamp to connect the side edge and the projection.

17. A liquid crystal display device, comprising:
a light source lamp;
an optical guide plate which guides light emitted from said light source lamp, said optical guide plate comprising:
a rectangular plate-shaped base portion;
a rectangular plate-shaped projection which projects from an edge of said base portion, said projection projecting in a direction perpendicular to the advancing direction of said light in said base portion and parallel to the plate surface of said base portion; and
a width expanded portion provided at a corner portion between said base portion and a farther side surface of said projection viewed from a side of said light source lamp, wherein said width expanded portion has an edge of a shape formed by combining a smooth curved surface and a plane, and the width of said width expanded portion progressively increasing toward said optical lamp;
a liquid crystal display panel provided on said optical guide plate; and
a frame body which integrates said light source lamp, said optical guide plate and said liquid crystal display panel, said frame body having a recessed portion to which said projection and said width expanded portion engage.

18. The liquid crystal display device according to claim 17, wherein said side surface comprises a portion being perpendicular to the edge of said base portion from which said projection projects.

19. The liquid crystal display device according to claim 17, wherein said width expanded portion has an edge having a smooth curved surface shape.

20. The liquid crystal display device according to claim 19, wherein the radius of curvature of said edge of said curved surface shape is at most the projecting width of said projection.

21. The liquid crystal display device according to claim 17, wherein said width expanded portion has an edge including a plurality of planes.

22. The liquid crystal display device according to claim 17, wherein said width expanded portion has a plane edge.

23. A liquid crystal display device, comprising:

a light source lamp;

an optical guide plate which guides light emitted from said light source lamp, said optical guide plate comprising:

a rectangular plate-shaped base portion;

a rectangular plate-shaped projection which projects from an edge of said base portion, said projection projecting in a direction perpendicular to the advancing direction of said light in said base portion and parallel to the plate surface of said base portion; and a width expanded portion provided at a corner portion between said base portion and a farther side surface of said projection viewed from a side of said light source lamp, wherein said width expanded portion has a plane edge, and the width of said width expanded portion progressively increasing toward said optical lamp;

a liquid crystal display panel provided on said optical guide plate; and a frame body which integrates said light source lamp, said optical guide plate and said liquid crystal display panel, said frame body having a recessed portion to which said projection and said width expanded portion engage.

24. The liquid crystal display device according to claim 23, wherein said side surface comprises a portion being perpendicular to the edge of said base portion from which said projection projects.

25. The liquid crystal display device according to claim 23, wherein said width expanded portion has an edge having a smooth curved surface shape.

26. The liquid crystal display device according to claim 23, wherein the radius of curvature of said edge of said curved surface shape is at most the projecting width of said projection.

27. The liquid crystal display device according to claim 23, wherein said width expanded portion has an edge including a plurality of planes.

* * * * *

UNITED STATES PATENT AND TRADEMARK OFFICE
CERTIFICATE OF CORRECTION

PATENT NO.    : 6,512,557 B1
DATED         : January 28, 2003
INVENTOR(S)   : Miwa It is certified that error appears in the above-identified patent and that said Letters Patent is hereby corrected as shown below:

Column 11,
Line 52, "according to claim 6" should be -- according to claim 8 --.

Signed and Sealed this

Twenty-fourth Day of August, 2004

JON W. DUDAS
*Director of the United States Patent and Trademark Office*